2,746,143

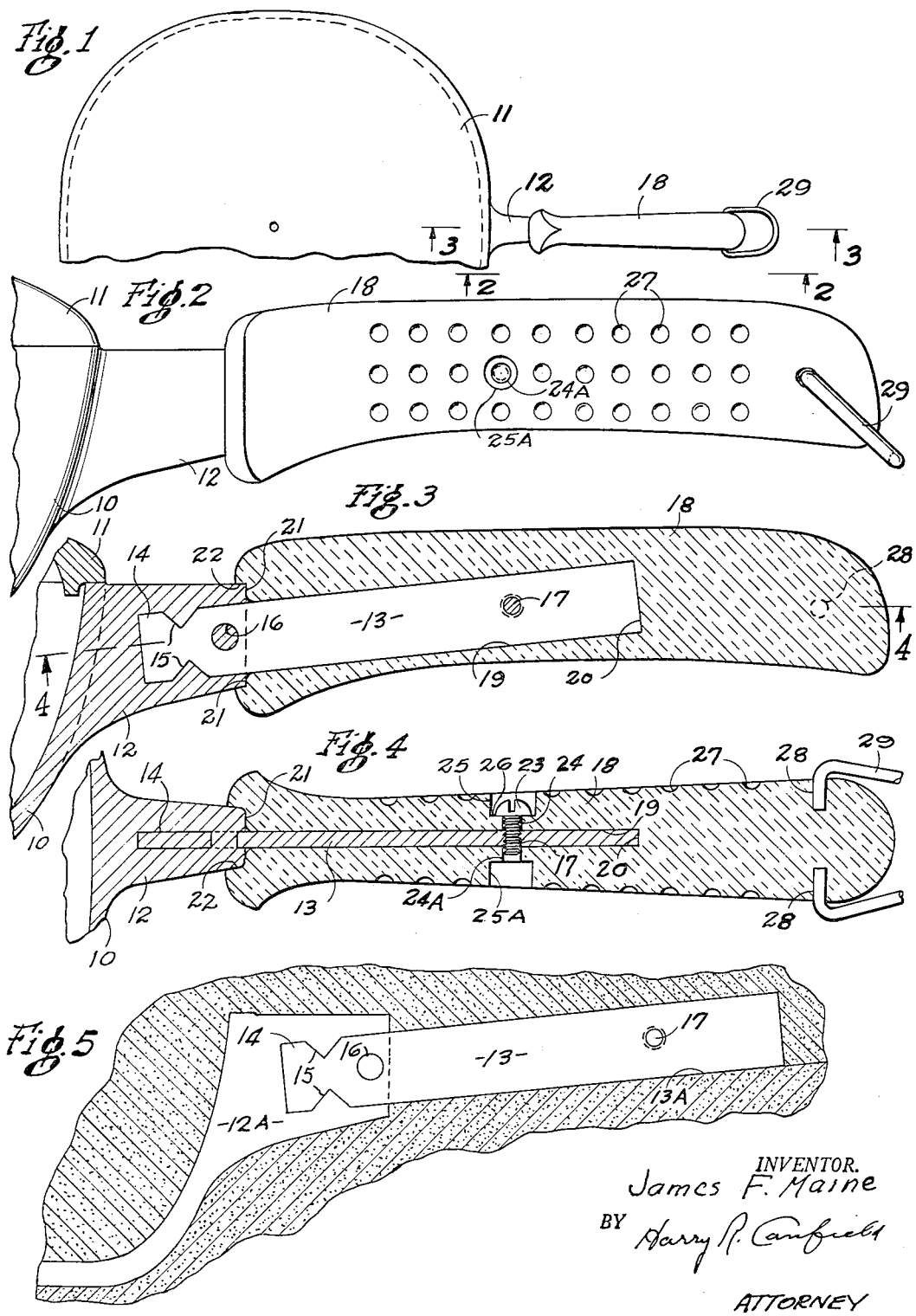
May 22, 1956     J. F. MAINE     2,746,143
METHOD OF MAKING A COOKING VESSEL AND HANDLE THEREON
Filed Oct. 7, 1953
INVENTOR.
James F. Maine
BY Harry R. Campbell
ATTORNEY United States Patent Office 2,746,143
Patented May 22, 1956

METHOD OF MAKING A COOKING VESSEL AND HANDLE THEREON

James F. Maine, Euclid, Ohio, assignor to The Consolidated Iron-Steel Mfg. Co., Cleveland, Ohio, a corporation of Ohio Application October 7, 1953, Serial No. 384,550

1 Claim. (Cl. 29—529)

This invention relates to handles, particularly to handles for cooking utensils.

The invention is applicable to a variety of classes of cooking utensils, but as a concrete example for purposes hereof it will be described as applied to skillets; but it is to be understood that it is not limited thereto.

The manufacture of skillets and like kitchen ware from cast iron, has been until recently largely superseded by press forming them from sheet metal.

There is now however a growing commercial demand for cast iron kitchen ware or utensils revived by the recognized superior thermal properties of cast iron; and by the trend to attractive design contours for kitchen equipment generally, and by the development of enamels and enamelling processes by which cast iron utensils can be made in a choice of bright attractive colors to harmonize with the color schemes of the modern kitchen.

The problem however arises of providing a handle for such enamelled cast iron wear, that will be itself of ornamental contour; and at the same time have an attachment or mounting therefor that will not be visible and thereby detract from the overall ornamental appearance of the utensil; and which will not deteriorate and lose its ornamental appearance, nor become too hot for comfort, nor become loose mechanically upon being subjected to the heat conducted into it from the cast iron utensil.

It is the object of the present invention to provide a method of making a handle that solves this problem, and that has the desirable characteristics mentioned above.

The invention when applied to a skillet, for example, comprises in general an elongated steel handle core that is embedded at one end in the cast iron of the skillet in a predetermined position, and rigidly and permanently anchored therein when the skillet is molded; and a handle proper of modelled, molded, plastic material surrounding and completely concealing the core and rigidly secured to it in a manner to remove all possibility of its becoming loose or of rotating on the core; and comprises features to be described which adapt such a handle and mounting to ornamental design as referred to.

The invention is fully disclosed in the following description taken in connection with the accompanying drawing in which:

Fig. 1 is a top plan view of a fragment of a utensil with the handle of the invention attached thereto;

Fig. 2 is an elevational view of a part of Fig. 1 to a larger scale, taken in the direction of the arrow 2 of Fig. 1;

Fig. 3 is a longitudinal sectional view of the parts of Fig. 2, and the section may be referred to the plane 3—3 of Fig. 1;

Fig. 4 is a sectional view taken from the plane 4—4 of Fig. 3; and,

Fig. 5 is a sectional view of a part of a sand mold in which the utensil is cast and illustrating the positioning of a handle core therein.

Referring to the drawing there is shown at 10, a fragment of the main body part of a cooking utensil, for example, a skillet, having a cover or lid part 11, both parts made as iron castings.

The skillet 10 has a handle lug 12 cast integral therewith, projecting laterally from its side, near its top.

The skillet parts, including the body 10, lug 12, and cover 11, are designed with ornamental contours, and enamelled inside and outside with bright colored enamel; this feature not being a part of the invention and not shown; except that the enamel on the lug 12 extends thereover out to its end and is there overlapped by a part of the handle to be described; so that the mounting of the handle, which is a part of the invention, leaves no unenamelled part of the lug exposed to view.

The body part 10 is preferably cast in a sand mold made from a pattern; and before pouring the iron into the mold, a handle core 13, preferably made from a cut-off length of steel bar, is placed in the mold, the pattern being formed to provide in the mold a recess 13A in which the core is laid to support and position it; see Fig. 5.

The steel core 13, for a skillet of the usual size, is preferably about 4⅜" long, ⅝" wide and ⅛" thick; and one end as at 14, projects a measured distance preferably about 1" into the lug mold cavity 12A, Fig. 5, this distance being predetermined by the recess 13A in the mold which supports and positions the core therein longitudinally.

When the iron is poured into the mold it flows around and over the end 14 of the core 13, and when the iron solidifies the end is thereby permanently rigidly embedded in the lug and the free end of the core projects a predetermined distance outwardly from the end of the lug; and the core is preferably positioned in the mold as aforesaid so that the free end is inclined upwardly at an angle, as shown.

To anchor the core permanently and rigidly in the lug, and to prevent it from being withdrawn or becoming loose, it is interlocked with the metal of the lug by notches 15—15 formed in its opposite edges, and by a hole 16 therethrough, into which the metal of the lug flows; and the rectangular cross section of the core also contributes to the rigidity of the interlock, by opposing any forces on the core in the direction tending to rotate it on its major axis.

About 1¼" from the outer end of the core it is provided with a threaded hole 17.

The handle 18 is separately made of a molded plastic material; and is molded with a rectilinear socket 19 therein, closed at its inner end as at 20, and of cross sectional form and dimensions to have a sliding fit with all surfaces of the free end of the core whereby it may be telescoped thereover.

The inner end of the handle 18 has an end surface 21 that abuts upon the end of the lug 12, and is concave so as to fit around and overlap a portion of the enamelled end of the lug as at 22 when the handle is telescoped over the core 13.

The sliding fit of the handle socket 19 with the rectangular-section core 13, makes it impossible for the handle to rotate around the core 13.

The handle is anchored against untelescoping from the core, by a screw 23. The handle is molded with a transverse hole 24 positioned to come in alignment with the threaded hole 17 in the core, in the predetermined position of the core, when the handle is telescoped over the core and abuts the lug at 21 as described; and the outer part of the hole 24 is of enlarged diameter as at 25 providing an intermediate shoulder 26.

The screw 23 is projected into the hole 24 and screwed into the threaded hole 17, the enlarged diameter part 25 of the hole receiving the screw head, and the head 25 of the hole receiving the screw head, and the head being screwed tight upon the shoulder 26. This clamps the wall of the socket 19 and the core 13 together; and the screw substantially fits the hole 24; and these features jointly anchor the handle on the core as aforesaid.

To facilitate providing the hole 24—25 in the handle, the hole is molded around a core supported in the handle mold; and to insure holding the core in predetermined position the core extends all the way across the handle mold and is supported therein at both ends; whereby as shown, there is molded a hole 24A—25A at the other side of the socket opposite to and aligned with the hole 24—25. The screw 23 can be used with either the hole 24—25 or the hole 24A—25A. The holes 24A—25A however are not essential as will be understood, the hole 24—25 being sufficient by itself.

The handle 18 adjacent to the screw 23 is made thick enough so that the head of the screw is well below the outer surfaces of the handle, and the screw head is concealed except when looking directly into the hole 25; and the screw head may be enamelled black to render it all the more invisible.

The core 13 will absorb heat from the cast iron skillet through the lug 12, and conduct it to the handle 18.

The plastic material of the handle 18 is chosen to be of a color that harmonizes with the color of the enamel on the skillet; and is chosen to be one that is not deteriorated or discolored by the heat; and that has low specific heat capacity so as not to become unpleasantly hot when gripped by the hand of the user.

The screw 23 will receive heat from the core, but being well below the surface of the handle, cannot be touched by the hand of the user.

The handle is molded with a plurality of small recesses 27—27 to afford a firm grip for the hand; and the handle as a whole may be molded with ornamental contours harmonizing with those of the skillet and cover.

A pair of opposite axially aligned holes 28—28 are provided at the outer end of the handle into which parallel ends of a generally C-shaped loop of wire 29 may be inserted to provide a hinging hanger for hanging up the skillet when not in use.

From the foregoing it will be seen that advantageously, the core 13 may be separately made in quantities, with the threaded hole 17 formed therein at a predetermined measured distance from the inner end of the core; and that when the core thus made is supported in a predetermined position in the mold cavity as aforesaid, the threaded hole will be a predetermined distance from the extreme end of the lug.

The handle also is separately made with the hole 24—25 the same predetermined distance from the end surface 21 of the handle that abuts upon the end of the lug; so that when the handle is telescoped on the core into abutting position, the handle hole 24—25 aligns axially with the threaded hole 17 in the core.

Without these provisions, the hole 17 would have to be drilled and threaded in the core 13 after the core had been embedded in the lug, and had become an integral part of the skillet and was no longer a separate piece.

This would be an awkward, inefficient and unduly expensive operation. The skillets would already have been enamelled (so that rejects for faulty enamel would entail the minimum of loss) and they would one at a time have to be picked up and put into a drill and tapping jig, and held therein while the core hole was being drilled and threaded; and the handling of the heavy skillet for this operation would have to be done slowly and circumspectly, to avoid injury to the enamel, and similarly the clamping parts of the jig would have to be cushioned, to protect the enamel.

Also in such operation a separate dummy handle with a dummy hole 24—25 would have to be made, as a template to guide the drill and tap. The handle itself could not be used for this purpose because of liability that it would be multilated. The drilling and tapping jig would therefore require skill to operate it and be expensive to maintain and its use would add unduly to the cost of production.

By the aforesaid provision, the cores 13 can be completely finished as separate pieces, with the threaded hole 17 therein and this can be cheaply done by rapid quantity production methods. The setting of the steel core accurately in the mold as described, introduces no difficulty or added cost, because the procedure would be the same as that of setting ordinary sand cores in molds and foundry men are well acquainted with this procedure.

I claim:

The method of making a utensil and a handle thereon which includes: making an elongated metal handle core and making a transverse threaded hole therein at a first predetermined distance from one end thereof; making a sand mold cavity comprising a utensil wall cavity portion and a lateral lug cavity portion communicating with the wall cavity portion and having a terminal end wall, and a core cavity portion communicating with the lug cavity portion through its said end wall; forming the core cavity portion to receive the core placed therein, and to dispose the other end of the core to project within the lug cavity portion and to dispose the said one end of the core at a second predetermined distance from the lug cavity portion end wall; pouring metal into the said cavity portions to form the utensil wall, and to form a lug integral therewith terminating in a lug end, and to embed the said other end of the core in the lug, with the core projecting out of the lug end, and with the one end of the core at said second predetermined distance from the lug end; making a handle grip having a longitudinal recess in one for telescoping over the projecting core; making a transverse hole through the grip at a third predetermined distance from said one end of the grip, equal to the second predetermined distance minus the first predetermined distance; telescoping the grip over the core to engage its one end with the lug end, and, by virtue of said predetermined distances, thereby aligning the grip hole and threaded hole; and projecting a threaded element through the grip hole and screwing it into the threaded hole.

References Cited in the file of this patent

UNITED STATES PATENTS

| | | |
|---|---|---|
| 397,098 | Torrance | Jan. 29, 1889 |
| 542,449 | Sperry | July 9, 1895 |
| 1,728,619 | Lambert | Sept. 17, 1929 |
| 1,900,565 | Kircher | Mar. 7, 1933 |
| 1,909,494 | Leins | May 16, 1933 |
| 2,133,252 | Moore | Oct. 11, 1938 |